3,498,969
PHOSPHONATE AMINE POLYOL COMPOUNDS AND A PROCESS FOR PREPARING SAME

Morton Lewis, Elmhurst, Ill., assignor to Swift & Company, Chicago, Ill., a corporation of Delaware
No Drawing. Filed Oct. 11, 1967, Ser. No. 674,667
Int. Cl. C08f *9/38*
U.S. Cl. 260—211
10 Claims

ABSTRACT OF THE DISCLOSURE

Condensation products are formed by reacting a carbonyl containing polyol with a primary or secondary amine and an aliphatic acid phosphite. A wide range of amines and phosphites are set forth along with a large variety of polyols. The resulting compositions can be used as surfactants, flame retardants, etc.

---

This invention relates broadly to organic phosphorous polyol compounds, and is particularly concerned with organic phosphorous compounds which contain a nitrogen-carbon-phosphorous-oxygen linkage and with a process for producing them.

In particular, this invention relates to polyols substituted with an amine moiety and a phosphonic acid and/or ester moiety which may be used as surface-active agents, emulsifiers, pour-point depressants, as modifying agents in extreme pressure lubricants, plasticizers for vinyl resins and other polymeric materials, as fungicides, bactericides and insecticides, etc. Since the novel compositions of this invention possess multiples hydroxy groups, these compounds can actually react with isocyanates in the formation of urethane foams to produce flame-resistant copolymers. In this respect, they may replace some or all of the polyol generally used in such formulations.

It is the object of this invention to prepare new compositions of matter.

Another object of this invention is to prepare novel esters of phosphonates possessing phosphorous-carbon-nitrogen linkage.

Still another object of this invention is to provide novel polyols containing phosphorous and halogen atoms.

Additional objects, if not specifically set forth herein, will be readily apparent to those skilled in the art from a reading of the detailed description of the invention which follows.

In general, the novel compounds of this invention may be represented by the general formula:

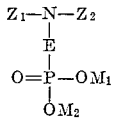

wherein $Z_1$ and $Z_2$ may be the same or different and represent hydrogen, aliphatic groups which may be saturated or unsaturated, straight or branched chained radicals as well as an

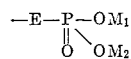

group. These aliphatic groups may be unsubstituted or substituted with non-interfering groups.

At this point it should be noticed that the compounds may exist in their zwitter ionic form caused by an intramolecular rearrangement of either $M_1$ or $M_2$ group and represented by the following structure:

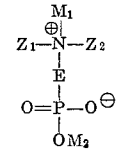

For the sake of brevity only the nonionic form will be used throughout the specification and claims.

In the foregoing general formulas, E is a polyol and $M_1$ and $M_2$ may be the same or different and may be hydrogen, alkali metal ion, ½ alkaline earth metal ion, ammonium ion, alkylamine ions, alkylolamine ions, aryl and saturated or unsaturated, straight or branched chained alkyl, alkylaryl or arylalkyl groups which in turn may be unsubstituted or substituted with non-interfering substituents. Generally, the polyol portion of the molecule will contain less than about 18 carbons and may be esterified, etherified, reduced, oxidized, etc., and particularly includes the reducing polysaccharides and monosaccharides. However, the polyol need not have a 1:1 ratio of hydroxy groups per carbon atom. The useful polyols usually range between 3-8 carbons having 2-7 hydroxy groups.

A specific subclass of compounds may be represented by:

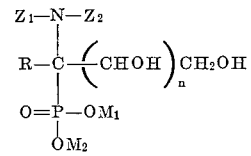

wherein R is H, or $\text{(CHOH)}_m\text{CH}_2\text{OH}$; $m$ and $n$ are integers of 0–16; $Z_1$ and $Z_2$ may be the same or different and are H, alkyl, alkenyl, alkynyl, aryl, arylalkyl or alkylaryl, straight or branched chain radicals of 1–30 carbons and which may be unsubstituted or substituted with hydroxyl or halo groups; and $M_1$ and $M_2$ are H, alkali metal ion, ½ alkaline earth metal ion, ammonium ions, aryl and alkyl, alkenyl, alkynyl, arylalkyl and alkylaryl straight or branched chain radicals of 1–20 carbons and which may be substituted with hydroxyl and/or halo groups. In the above formula, $Z_1$ and $Z_2$, $M_1$ and $M_2$ are usually H or alkyl, alkenyl, halo or hydroxy substituted alkyl radicals of 1–18 carbons. More specifically, in regard to a subgeneric class of these compounds, when R equals H, then it is preferred to have $n$ equal to 9 or less and when R equals $\text{(CHOH)}_m\text{CH}_2\text{OH}$ then $m+n$ should be 8 or less. The most preferred compounds of this invention can be represented by the above formula with the provision that $n$ is 3, 4, or 5 when R=H and $m+n=0$, 1, 2, or 3 when R=$\text{(CHOH)}_m\text{CH}_2\text{OH}$.

Briefly, the novel compositions of this invention are produced by a condensation reaction of the polyol containing a carbonyl group with a primary or secondary amine and an aliphatic phosphite such as a dialkyl phosphite. Generally speaking, the reaction is exothermic and, hence, the reaction system is cooled until the exothermic reaction is complete. In some instances, i.e., when using long chain alkyl phosphites, the reaction is endothermic and heat must be applied in order for the reaction to take place at a reasonable rate.

The products resulting from the reaction of the polyol with the lower amines and lower alkyl phosphites are water-soluble and remain water-soluble to water dispersible as either the alkyl amine or alkyl phosphite chain length is increased up to about 20 carbon atoms. As the chain of both the amine and phosphite increases in length, the products become oily to viscous pastes which become insoluble in water but are soluble in the typical organic solvents.

During the reaction, water is split out but does not present hydrolysis problems in regard to the phosphonic ester. The neutral ester of the phosphonic acid can be subjected to either acidic or basic hydrolysis to form the free phosphonic acid, which in turn can be reacted with alkyl amines, alkanolamines, inorganic bases such as alkali metal hydroxides and alkaline earth metal hydroxides to form the corresponding salts.

In detail as to the specific reactants, the amine reactant may be designated as either a primary or secondary amine of 1–30 carbons, being either saturated or unsaturated, branched or straight chain, and either unsubstituted or substituted with non-interfering groups such as halo and/or hydroxy functions. One group of amines, which, when reacted with the polyols and phosphites, produce compositions which may be classified as surface active agents are the higher fatty amines of about 10–18 carbon atoms. Examples of this class of amines include decylamine, dodecylamine, tetradecylamine, hexadecylamine, and octadecylamine, as well as the corresponding secondary amines Another class of useful amines are the unsaturated primary or secondary higher fatty amines such as oleylamine, ricinoleylamine, erucylamine, linoleylamine, linolenylamine and clupanodonlyamine produced from the corresponding fatty acids as well as the more synthetic amines of 3–18 carbons such as propyleneamine, hexyleneamine, decyleneamine, hexadecyleneamine, and octadecyleneamine etc. These unsaturated amines are of particular importance inasmuch as they can be halogenated prior to or after reaction with the polyol and phosphite to give molecules containing both halogen and phosphorous. Such compositions possess excellent flame resistant properties. The unsaturated amines of 10–18 carbon atoms also possess surface active properties.

Another group of useful amines comprises the primary and secondary alkylolamines which may contain mixed alkylol radicals or alkyl and alkylol radicals. Suitable alkanolamines include ethanolamine, propanolamine, isopropanolamine, butanolamine, hexanolamine, diethanolamine, dipropanolamine, dibutanolamine, diisobutanolamine, dipentanolamine, dioctanolamine, tris(hydroxy ethyl) aminomethane, tris(hydroxy methyl) aminomethane, 2 - amino - 2 - methyl-propanediol, etc. Mixed alkanolamines such as 2 - hydroxy - ethyl propanolamine, 2-hydroxyethyl butanolamine, 2-hydroxypropyl butanolamine can be used as well as the alkylalkanolamines such as ethyl ethanolamine, propyl propanolamine, ethyl isopropanolamine, isopropyl butanolamine, etc.

Still a further group of suitable amines are the mono- and poly halogenated fatty amines of about 2–20 carbons, preferably of 8–18 carbons. The amino group of this class of compounds may be either in a terminal position or attached to an internal carbon. Suitable examples include: 6,7-dibromo octylamine, 8-chloro dodecylamine, 9,10-dichloro octadecylamine, 9, 10- dibromo octadecylamine, etc.

Polyols suitable for reaction with the amine and phosphite are the carbohydrates, i.e. aliphatic ketone-polyalcohols or aldehyde polyalcohols of less than about 18 carbon atoms. Of particular importance are the monosaccharides; pentoses and hexoses being the most important, however, trioses, tetroses, and heptoses, are of considerable value.

The preferred polyols may be represented by the formula:

$$R-\overset{O}{\underset{\|}{C}}-(CHOH)_n CH_2OH$$

wherein R is H or $-(CHOH)_m CH_2OH$ and $m$ and $n$ are integers of less than 10. When R equals H, then $n$ should equal 6 or less and when R equals $-(CHOH)_m CH_2OH$ then $m+n$ should be 5 or less. The most preferred polyol reactants of this invention may be represented by the above formula with the provisions that $n$ is 3 or 4 when R equals H and $m+n$ equals 0, 1, 2 or 3 when R equals $-(CHOH)_m CH_2OH$.

Glyceraldehyde and dihydroxyacetone are representative members of the trioses while threose and its epimer erythrose are representative members of the tetroses. Lyxose, xylose, arabinose, and ribose are typical of the aldopentoses. Aldohexoses include talose, galactose, idose, gulose, mannose, glucose, altrose and allose. The ketoses corresponding to the above-mentioned aldoses are also included as well as the deoxyaldoses such as rhamnose and fucose. Perhaps the best representatives of the ketoses class are fructose, sorbose, ribulose and erythrulose. Also included within the list of the above sugars are all the optical isomers whether active or not such as racemic mixtures, and also the reducing disaccharides such as maltose and lactose.

Dialkyl and dialkenyl phosphites which are suitable include dimethyl phosphite, diethyl phosphite, dipropyl phosphite, dibutyl phosphite, dioctyl phosphite, didodecyl phosphite, ditetradecyl phosphite, dioctadecyl phosphite, diallyl phosphite, dioctadecenyl phosphite, methyl ethyl phospite, dodecyl octadecyl phosphite, butyl octadecenyl phosphite, ethyl dodecyl phosphite, etc.

Halogenated dialkylphosphites can be used, and indeed, are preferred in some instances. Representatives of this class or reactans include di-(beta-chloroethyl) phosphite, di-(beta-fluoroethyl) phosphite, di-(beta-bromoethyl) phosphite, di-(dichloropropyl) phosphite, di-(dibromopropyl) phosphite, etc.

Of particular importance are the long chain unsaturated amines and unsaturated phosphites inasmuch as these compounds, after being reacted with the polyol, provide multiple reactive sites for halogenation. Such polyhalogenated compounds are quite useful in polyurethane foams and other isocyanate polymers. Halogenation of the amine and/or unsaturated phosphite moieties is generally most effectively accomplished by contacting the unsaturated amino polyol phosphonate with free halogen (usually chlorine or bromine). A suitable solvent can be used if necessary to moderate the reaction.

The addition of the halogen should be conducted at rather low temperatures to avoid decomposition of the phosphorous-containing product. Thus, during addition of the halogen, the reaction mixture temperature should be kept below about 25° C. After the addition of the halogen is complete, the reaction mixture may be warmed to a somewhat higher temperature, preferably not exceeding about 60° C. to insure completion of the halogenation.

In many cases, it may be found best to maintain the reaction at low temperatures, i.e., in the range of from about −10° C. to about 20° C. during the addition of the halogen and then warm the mixture to a higher temperature to insure complete reaction. Particular suitable solvents for the halogenation reaction include diethyl ether, benzene, methyl alcohol or water.

An outstanding use for the novel polyols of this invention is in providing flame resistance for isocyanate or polyurethane foam-type formulations. The polyols may be used individually or in various mixtures and combinations. Due to the fact that these compositions possess multiple hydroxy groups, the compounds actually react with isocyanates in the formation of urethane foams to produce flame resistant copolymers. In this respect, they may replace some or all of the polyols generally used in such formulations.

Actual utility of the flame resistant foams is typified by the technique of foaming-in-place insulation. Such insulation has been used in automobiles, refrigerators and aircraft wherein the foams add strength as well as fire resistance to the various components. The degree of cross-linking and thus the type of polyols to be used, determines whether the final product is rigid or flexible. Since the polyols of this invention may replace only a part of the normally used polyols, they are thus adaptable for use in either flexible or rigid foams.

The following examples are set forth as illustrated embodiments of the invention and are not to be taken in any manner as limiting the scope of the invention.

EXAMPLE I

To a rapidly stirred cold mixture of 58.5 grams (0.3 mole) of dodecylamine and 33.0 grams (0.3 mole) of dimethylphosphite was added 54.0 grams (0.3 mole) of dextrose dissolved in 125 ml. of water. External cooling was applied to control the very large exotherm. After all the dextrose solution was added, the ice bath was removed and the reaction mixture stirred at room temperature for one hour. The resulting product formed a clear, light yellow, water solution. To isolate the product, 300 ml. of diethyl ether was added along with enough solid sodium chloride to form a saturated solution. In this way it was possible to salt out the highly water soluble organic product into the ether phase. The ether solution was dried over sodium sulfate and the solvent removed by evaporation under reduced pressure to give a light yellow solid product which possessed the following surface active properties.

DRAVES WETTING TIME 25° C.

| Conc., percent: | Time, sec. |
|---|---|
| 1.0 | <1 |
| 0.50 | 12 |
| 0.375 | 28 |
| 0.250 | >200 |

SURFACE TENSION 25° C.

| Conc., percent: | Dynes/cm. |
|---|---|
| 0.10 | 29.3 |
| 0.010 | 47.3 |
| 0.001 | 62.3 |
| 0.0001 | 64.2 |

INTERFACIAL TENSION, 25° C.

| Benzene-Water | | Hexane-Water | |
|---|---|---|---|
| Conc., percent | Dynes/cm. | Conc., percent | Dynes/cm. |
| 0.10 | 0 | 0.10 | 0 |
| 0.010 | 6.3 | 0.010 | 11.6 |
| 0.001 | 25.7 | 0.001 | 34.4 |
| 0.0001 | 28.1 | 0.0001 | 40.7 |

ROSS MILES POUR FOAM TEST, 25° C.

| Conc., percent | Mm. foam, immediate | Mm. foam, after 5 min. |
|---|---|---|
| 1.00 | 195 | 190 |
| 0.25 | 150 | 150 |
| 0.10 | 45 | 40 |
| 0.01 | 0 | 0 |

EXAMPLE II

To a rapidly stirred cold mixture of 18.5 grams (0.1 mole) of dodecylamine and 11.0 grams (0.1 mole) of dimethylphosphite was added 18.0 grams (0.1 mole) of fructose dissolved in 35 ml. of water. External cooling was applied to control the immediate exotherm. There was an increase in viscosity noticed. The ice bath was removed and the reaction mixture stirred at room temperature for about ½ hour. The resulting product was a clear, light yellow solution which is very surface active. The material gave a high foam with a high degree of foam stability.

EXAMPLE III

To a rapidly stirred mixture of 27.8 grams (0.1 mole) of octadecylamine which was preheated to liquefy and 11.0 grams (0.1 mole) of dimethylphosphite was added 18.0 grams (0.1 mole) of dextrose dissolved in 36 grams of water. The reaction got quite hot after the addition of the dextrose and on stirring turned dark with an increased viscosity. After approximately ½ hour of stirring without external heating, the product was allowed to cool. The cool product is a wax-like semi-solid, soluble in water on dilution and posesses desirable surface active properties.

EXAMPLE IV

To a rapidly stirred pre-heated mixture of 26.8 grams of tallow amine (0.1 mole) and 11.0 grams dimethylphosphite (0.1 mole) was added 18.0 grams (0.1 mole) of dextrose in 36 grams of water. Upon the addition of the dextrose the reaction showed an immediate exotherm. The heat was maintained externally by means of a hot plate stirrer. Within 15 minutes the viscosity built up to a point where the product gelled. Isopropanol was added to decrease the viscosity and the reaction mass was then heated for an additional three hours. The product was blackish wax-like semi-solid which dissolved on dilution in water and possessed excellent surface active properties.

EXAMPLE V

To a rapidly stirred cold mixture of 18.5 grams of dodecylamine (0.1 mole) and 11.0 grams (0.1 mole) of dimethylphosphite was added 9.0 grams (0.1 mole) of dihydroxyacetone. External cooling was applied to control the very large exotherm and the very vigorous reaction which took place after the addition of the dihydroxyacetone. The product turned very dark in color and the reaction was completed in about 15 minutes. The product was found to be water soluble and possessed surface active properties in both acidic and basic solution.

EXAMPLE VI

Dextrose (36.0 grams—0.2 mole) was dissolved in 100 ml. of water and added to a rapidly stirred cold mixture of 54.2 grams (0.2 mole) of oleylamine and 22.0 grams (0.2 mole) of dimethylphosphite. The reaction mixture got hot immediately and it was necessary to cool it with an external ice bath. The reaction mixture formed a creamy emulsion which after a short time got so thick that 50 ml. of methyl alcohol was added to decrease the viscosity. The reaction mixture was stirred for one hour at room temperature, after which 150 ml. of benzene was added, followed by 32.0 grams (0.4 mole) bromine. The bromine was added slowly and the reaction temperature controlled so that it stayed below 20° C. Stirring was continued for one hour after the addition of all the bromine. The reaction product was then poured into a separatory funnel and the water layer removed. The organic layer was washed with a saturated sodium chloride solution, dried over sodium sulfate and the solvent removed by evaporation under reduced pressure. The halogenated product functioned satisfactorily as a flame retardant. The unhalogenated product possessed the following surfactant properties:

DRAVES WETTING TIME 25° C.

| Conc., percent: | Time, sec. |
|---|---|
| 1.0 | 17 |
| 0.500 | >100 |

SURFACE TENSION 25° C.

| Conc., percent: | Dynes/cm. |
|---|---|
| 0.10 | 29.8 |
| 0.010 | 33.4 |
| 0.001 | 42.2 |
| 0.0001 | 66.8 |

INTERFACIAL TENSION 25° C.

| Benzene-Water | | Hexane-Water | |
|---|---|---|---|
| Conc., percent | Dynes/cm. | Conc., percent | Dynes/cm. |
| 0.10 | 0 | 0.10 | 0 |
| 0.010 | 5.1 | 0.010 | 0 |
| 0.001 | 18.6 | 0.001 | 24.3 |
| 0.0001 | 28.0 | 0.0001 | 33.3 |

ROSS MILES POUR FOAM TEST 25° C.

| Conc., percent | Mm. foam, immediate | Mm. foam, after 5 min. |
|---|---|---|
| 1.00 | 190 | 180 |
| 0.25 | 175 | 155 |
| 0.10 | 160 | 160 |
| 0.01 | 30 | 20 |

EXAMPLE VII

To a rapidly stirred mixture of 13.6 grams of oleylamine (0.25 mole) and 29.1 grams of dioleylphosphite (0.05 mole) was added 9.0 grams (0.05 mole) of dextrose dissolved to 20 ml. of water. There was no exotherm and it was necessary to heat the reaction mixture by means of a hot plate-stirrer. As the heating proceeded, the reaction mixture got more viscous and gelled in about 20 minutes. To decrease the viscosity, 25 ml. of isopropyl alcohol and 75 ml. of benzene were added. The reaction mixture was stirred and allowed to cool to room temperature. An external ice bath was added and the product cooled. Thereafter, the product was slowly brominated by the addition of 24 grams (0.3 mole) of bromine. The temperature was not allowed to exceed 20° C. After all the bromine had been added, the product was stirred for three-quarters of an hour. Diethylether was added and the water layer separated and drawn off. The organic layer was washed with a saturated sodium chloride solution and dried over sodium sulfate. The solvent was removed by evaporation under reduced pressure to give 56 grams of product (75% yield) as a dark yellow viscous oil highly acceptable as a flame retardant.

EXAMPLE VIII

A mixture of 38.8 grams of diallylamine (0.4 mole) and 44 grams of dimethylphosphite (0.4 mole) was stirred rapidly by means of a hot plate-stirrer before the addition of 72 grams of dextrose dissolved in 130 ml. of water. The exothermic reaction was run as previously described and the product worked up as described in the above examples. The water soluble halogen product recovered (210 grams, 76.5% yield) was a dark viscous oil possessing flame retardant properties.

EXAMPLE IX

To a rapidly stirred mixture of 12.1 grams of tris (hydroxymethyl) aminomethane and 11.0 grams dimethylphosphite was added 18.0 grams of dextrose in 30 ml. of water. There was an immediate exothermic reaction which had to be controlled by an external ice bath. After the initial exotherm was over (approximately 5 minutes) the reaction mass was heated for one hour to give a clear, light yellow, water soluble solution.

EXAMPLE X

To a rapidly stirred mixture of 10.5 grams (0.1 mole) diethanolamine and 11.0 grams (0.1 mole) dimethylphosphite was added 18.0 grams (0.1 mole) of dextrose in 30 ml. of water. The immediate initial exotherm was controlled by an external ice bath after which the reactants were heated on a hot plate-stirrer for approximately one hour to give a clear, slightly yellow, water soluble solution.

Obviously many modifications and variations of the invention as hereinbefore set forth may be made without departing from the spirit and scope thereof and therefore, only those limitations should be imposed as are indicated in the appended claims.

I claim:
1. A composition of matter represented by the formula:

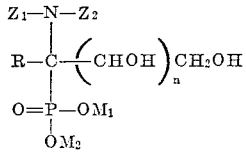

wherein R is H or $\text{(CHOH)}_m\text{CH}_2\text{OH}$. $m$ and $n$ are integers of 0–16; $Z_1$ and $Z_2$ may be the same or different and are H, alkyl, alkenyl, alkynyl, aryl, arylalkyl or alkylaryl, straight or branched chain radicals of 1–30 carbon atoms which may be substituted with hydroxyl or halo groups; and $M_1$ and $M_2$ are H, alkali metal ion, ½ alkaline earth metal ion, ammonium ion, aryl, alkyl, alkenyl, alkynyl, arylalkyl and alkylaryl, straight or branched chain radicals of 1–20 carbon atoms which may be substituted with hydroxyl or halo groups.

2. The composition of claim 1 wherein $n$ is 3, 4, or 5 when R is H and $m+n$ is 0, 1, 2, or 3 when R is

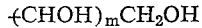

3. The composition of claim 1 wherein $Z_1$ and/or $Z_2$ are fatty radicals of 10 to 24 carbons.
4. The composition of claim 1 wherein $Z_1$, $Z_2$, $M_1$ and/or $M_2$ are halogenated radicals.
5. The composition of claim 1 wherein the polyol is a monosaccharide.
6. The composition of claim 1 wherein the polyol is a pentose or hexose.
7. The composition of claim 1 wherein the polyol is selected from the group consisting of dextrose, fructose and dihydroxyacetone.
8. A process for the production of an organic phosphorous polyol composition characterized by a nitrogen-carbon-phosphorous linkage, comprising reacting a primary or secondary amine of 1–30 carbon atoms with an aliphatic acid phosphite and a carbohydrate selected from the group consisting of monosaccharides, reducing disaccharides and mixtures thereof.
9. The process of claim 8 wherein the amine and the phosphite may be unsaturated.
10. The process of claim 9 wherein the unsaturated amine and unsaturated phospihte portions of the organic phosphorous polyol composition are susbequently halogenated.

References Cited

UNITED STATES PATENTS

| 2,353,558 | 7/1944 | Gzemski | 260—982 |
| 2,422,997 | 6/1947 | Wuest | 260—211 |
| 2,477,560 | 8/1949 | Flexser et al. | 260—211 |
| 2,490,573 | 12/1949 | Ratcliffe et al. | 260—234 |
| 2,884,411 | 4/1959 | Heyns | 260—211 |
| 3,089,869 | 5/1963 | Mauvernay | 260—234 |

LEWIS GOTTS, Primary Examiner

J. R. BROWN, Assistant Examiner

U.S. Cl. X.R.

252—39, 41, 49.9, 357; 260—2.5, 77.5, 211.5, 924, 932, 944, 945, 978, 999